United States Patent
Kim et al.

(10) Patent No.: US 9,465,265 B2
(45) Date of Patent: Oct. 11, 2016

(54) LIQUID CRYSTAL DISPLAY PIXEL

(71) Applicant: Samsung Display Co., Ltd., Yongin (KR)

(72) Inventors: Su-Jeong Kim, Seoul (KR); Hoon Kim, Ansan-si (KR); Ki-Chul Shin, Seongnam-si (KR); Dan-Bi Yang, Gunpo-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 91 days.

(21) Appl. No.: 14/529,891

(22) Filed: Oct. 31, 2014

(65) Prior Publication Data

US 2015/0185511 A1 Jul. 2, 2015

(30) Foreign Application Priority Data

Dec. 31, 2013 (KR) ........................ 10-2013-0168033

(51) Int. Cl.
*G02F 1/137* (2006.01)
*G02F 1/1343* (2006.01)
*G02F 1/1337* (2006.01)
*G02F 1/1362* (2006.01)

(52) U.S. Cl.
CPC ... *G02F 1/134363* (2013.01); *G02F 1/134336* (2013.01); *G02F 1/133707* (2013.01); *G02F 2001/134345* (2013.01); *G02F 2001/134381* (2013.01); *G02F 2001/136218* (2013.01)

(58) Field of Classification Search
CPC ............. G02F 1/134363; G02F 2001/134345; G02F 1/133707
See application file for complete search history.

(56) References Cited

U.S. PATENT DOCUMENTS

| | | | | |
|---|---|---|---|---|
| 6,469,765 | B1 * | 10/2002 | Matsuyama | G02F 1/134363 349/141 |
| 2003/0112397 | A1 * | 6/2003 | Lee | G02F 1/1393 349/129 |
| 2007/0126969 | A1 * | 6/2007 | Kimura | G02F 1/134363 349/141 |
| 2009/0046233 | A1 * | 2/2009 | Cho | G02F 1/133707 349/141 |
| 2009/0279010 | A1 | 11/2009 | Kim | |
| 2010/0002161 | A1 * | 1/2010 | Shin | G02F 1/134363 349/38 |
| 2010/0091231 | A1 * | 4/2010 | Nishimura | G02F 1/134363 349/139 |
| 2011/0105785 | A1 * | 5/2011 | Knoesche | C07C 263/10 560/347 |
| 2013/0208206 | A1 * | 8/2013 | Park | H01L 29/41733 349/46 |
| 2014/0055727 | A1 * | 2/2014 | Moriyama | G02F 1/134309 349/106 |

(Continued)

FOREIGN PATENT DOCUMENTS

| KR | 10-2009-0111161 | 10/2009 |
|---|---|---|
| KR | 10-2009-0116095 | 11/2009 |
| KR | 10-2010-0004302 | 1/2010 |

*Primary Examiner* — Sang V Nguyen
(74) *Attorney, Agent, or Firm* — H.C. Park & Associates, PLC

(57) ABSTRACT

A liquid crystal display (LCD) pixel includes a first substrate, a first electrode and a second electrode disposed on the first substrate, an insulation layer configured to overlap at least a portion of the first electrode and the second electrode, a first slit electrode and a second slit electrodes disposed on the insulation layer, a second substrate disposed across from the first substrate, an upper-plate common electrode disposed on the second substrate, and a liquid crystal layer interposed between the slit electrodes and the upper-plate common electrode. The LCD pixel driven by a plurality of regions in which different vertical electric fields are generated based on arrangements of at least one of the first electrode, the second electrode, the first slit electrode, the second slit electrode, and the upper-plate common electrode.

18 Claims, 10 Drawing Sheets

(56) References Cited

U.S. PATENT DOCUMENTS

2014/0240651 A1* 8/2014 Yoshioka .......... G02F 1/133707
  349/141

2015/0049269 A1* 2/2015 Okazaki ................ G02F 1/1337
  349/33
2015/0146125 A1* 5/2015 Kita .................. G02F 1/133707
  349/43

* cited by examiner

LIQUID CRYSTAL DISPLAY PIXEL

CROSS-REFERENCE TO RELATED APPLICATION(S)

This application claims priority from and the benefit under 35 USC §119(a) of Korean Patent Application No. 10-2013-0168033, filed on Dec. 31, 2013, the entire disclosure of is incorporated herein by reference for all purposes.

BACKGROUND

1. Field

Following description relates generally to a display device, more particularly, to a liquid crystal display (LCD) pixel included in a liquid crystal display device.

2. Discussion of the Background

An LCD device is one of flat panel display (FPD) devices that are widely used. Generally, an LCD device includes a lower substrate having pixel electrodes, an upper substrate having common electrodes, and a liquid crystal layer interposed between the lower substrate and the upper substrate. The LCD device applies voltages to the pixel electrodes and the common electrodes, and generates an electric field across the liquid crystal layer. The LCD device controls a polarized light that is emitted from a backlight unit by determining a direction of alignment for liquid crystal molecules included in the liquid crystal layer based on the electric field. The LCD device displays an image by controlling the polarized light. An LCD device of a vertically aligned (VA) type, in which a longer axis of the liquid crystal molecules is arranged in vertical direction towards the substrate when the electric field is not applied, is spotlighted because of various advantages, such as a high contrast ratio, a wide viewing angle, etc. However, a side-view visibility is inferior to a front-view visibility in the LCD device of the VA type.

SUMMARY

Exemplary embodiments of the present invention provide a liquid crystal display (LCD) pixel capable of improving a side-view visibility of an LCD device.

Additional features of the invention will be set forth in the description which follows, and in part will be apparent from the description, or may be learned by practice of the invention.

Exemplary embodiments of the present invention provide a liquid crystal display (LCD) pixel including a first substrate, a first electrode and a second electrode formed or disposed on the first substrate, an insulation layer configured to overlap at least a portion of the first electrode and the second electrode, a first slit electrode and a second slit electrode formed or disposed on the insulation layer, a second substrate disposed across from the first substrate, an upper-plate common electrode formed or disposed on the second substrate, and a liquid crystal layer interposed between the slit electrodes and the upper-plate common electrode. The LCD pixel may be driven by a plurality of regions in which different vertical electric fields are formed or generated based on arrangements of at least one of the first electrode, the second electrode, the first slit electrode, the second slit electrode, and the upper-plate common electrode.

According to aspects of the invention, the regions may include a first region having the first slit electrode, a second region having a first double-electrode that includes the first electrode and the second slit electrode, the second region being disposed adjacent to the first region, a third region having the second slit electrode, the third region being disposed adjacent to the second region, and a fourth region having a second double-electrode that includes the second electrode and the second slit electrode, the fourth region being disposed adjacent to the third region.

According to aspects of the invention, a liquid crystal molecule of the liquid crystal layer in the first region may be configured according a potential difference between a voltage applied to the first slit electrode and a voltage applied to the upper-plate common electrode.

According to aspects of the invention, a liquid crystal molecule of the liquid crystal layer in the second region may be configured according to a potential difference between a voltage applied to the first double-electrode and a voltage applied to the upper-plate common electrode.

According to aspects of the invention, a liquid crystal molecule of the liquid crystal layer in the third region may be configured according to a potential difference between a voltage applied to the second slit electrode and a voltage applied to the upper-plate common electrode.

According to aspects of the invention, a liquid crystal molecule of the liquid crystal layer in the fourth region may be configured according to a potential difference between a voltage applied to the second double-electrode and a voltage that is applied to the upper-plate common electrode.

According to aspects of the invention, the LCD pixel may be coupled to a pixel circuit that provides a voltage for configuring a liquid crystal molecule of the liquid crystal layer. The pixel circuit may include a gate line disposed on the first substrate, a data line disposed on the first substrate, in which the data line is arranged to cross the gate line, a lower-plate common electrode disposed on the first substrate, a first thin film transistor and a second thin film transistor, both of which are coupled to the gate line and the data line, a third thin film transistor coupled to the gate line and the second thin film transistor, a first capacitor coupled to the first thin film transistor, a second capacitor coupled to both the second thin film transistor and the third thin film transistor, and a shielding electrode formed or arranged to at least partially overlap the data line.

According to aspects of the invention, the first electrode and the first slit electrode may be coupled to the first capacitor and the second slit electrode may be coupled to the second capacitor.

According to aspects of the invention, the second electrode may be coupled to the lower-plate common electrode.

According to aspects of the invention, the second electrode may be coupled to the shielding electrode.

Exemplary embodiments of the present invention provide a liquid crystal display (LCD) pixel including a first substrate, a first electrode and a second electrode formed or disposed on the first substrate, an insulation layer configured to overlap at least a portion of the first electrode and the second electrode, a first slit electrode, a second slit electrode, and a third slit electrode formed or disposed on the insulation layer, a second substrate disposed across from the first substrate, an upper-plate common electrode formed or disposed on the second substrate, and a liquid crystal layer interposed between the slit electrodes and the upper-plate common electrode. The LCD pixel may be driven by a plurality of regions in which different vertical electric fields are formed or generated based on arrangements of at least one of the first electrode, the second electrode, the first slit electrode, the second slit electrode, the third slit electrode, and the upper-plate common electrode.

According to aspects of the invention, the plurality regions may include a first region having the first slit electrode, a second region having a first double-electrode that includes the first electrode and the second slit electrode, the second region being disposed adjacent to the first region, a third region having the second slit electrode, the third region being disposed adjacent to the second region, and a fourth region having a second double-electrode that includes the second electrode and the third slit electrode, the fourth region being disposed adjacent to the third region.

According to aspects of the invention, a liquid crystal molecule of the liquid crystal layer in the first region may be configured according to a potential difference between a voltage applied to the first slit electrode and a voltage applied to the upper-plate common electrode.

According to aspects of the invention, a liquid crystal molecule of the liquid crystal layer in the second region may be configured according to a potential difference between a voltage applied to the first double-electrode and a voltage applied to the upper-plate common electrode.

According to aspects of the invention, a liquid crystal molecule of the liquid crystal layer in the third region may be configured according to a potential difference between a voltage applied to the second slit electrode and a voltage applied to the upper-plate common electrode.

According to aspects of the invention, a liquid crystal molecule of the liquid crystal layer in the fourth region may be configured according to a potential difference between a voltage applied to the second double-electrode and a voltage applied to the upper-plate common electrode.

According to aspects of the invention, the LCD pixel may be coupled to a pixel circuit that provides a voltage for configuring a liquid crystal molecule of the liquid crystal layer. The pixel circuit may include a gate line disposed on the first substrate, a data line disposed on the first substrate, in which the data line is arranged to cross the gate line, a lower-plate common electrode disposed on the first substrate, a first thin film transistor and a second thin film transistor, both of which are coupled to the gate line and the data line, a third thin film transistor coupled to the gate line and the second thin film transistor, a first capacitor coupled to the first thin film transistor, a second capacitor coupled to both the second thin film transistor and the third thin film transistor, and a shielding electrode formed or arranged to at least partially overlap the data line.

According to aspects of the invention, the first electrode, the second electrode, and the first slit electrode may be coupled to the first capacitor and the second slit electrode may be coupled to the second capacitor.

According to aspects of the invention, the third slit electrode may be coupled to the lower-plate common electrode.

According to aspects of the invention, the third slit electrode may be coupled to the shielding electrode.

Exemplary embodiments of the present invention provides a liquid crystal display (LCD) pixel including a plurality of regions, in which a liquid crystal layer of the LCD pixel is driven by applying different voltages to the respective regions. As a result, a side-view visibility of the LCD device may be improved.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

Illustrative, non-limiting exemplary embodiments will be more clearly understood from the following detailed description taken in conjunction with the accompanying drawings.

DETAILED DESCRIPTION OF THE ILLUSTRATED EMBODIMENTS

Figure 1:
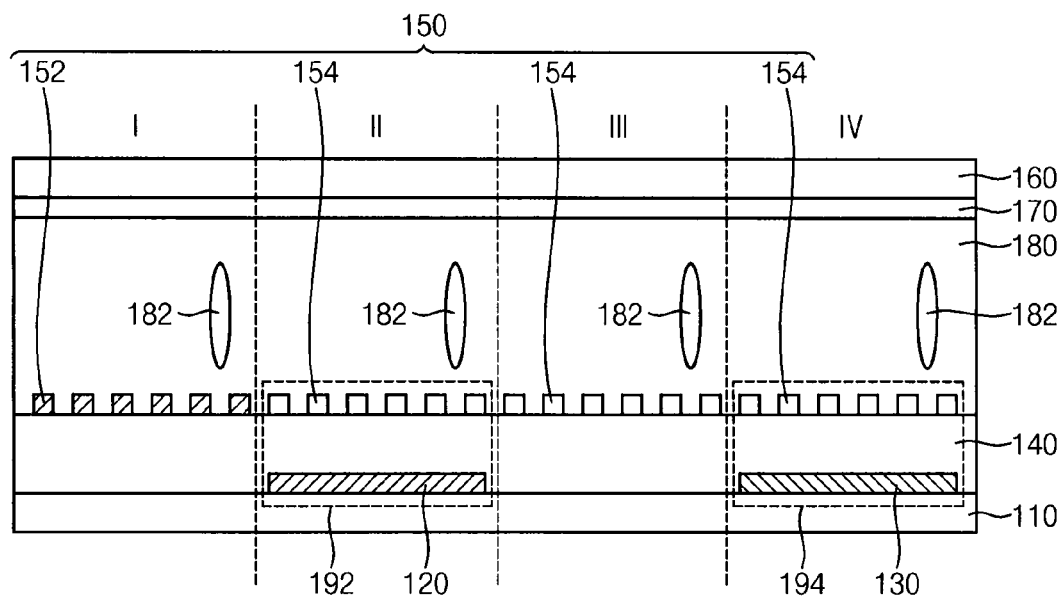
FIG. 1 is a cross-sectional view illustrating a liquid crystal display (LCD) pixel according to an exemplary embodiment of the present invention.

The invention is described more fully hereinafter with reference to the accompanying drawings, in which embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figure 2:
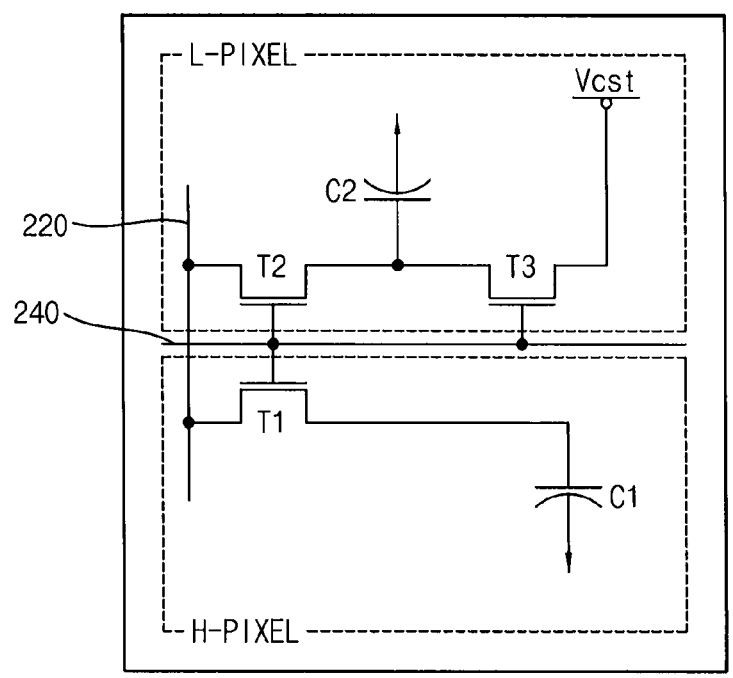
FIG. 2 is a circuit diagram illustrating a pixel circuit coupled to the LCD pixel of FIG. 1 according to an exemplary embodiment of the present invention.

FIG. 1 is a cross-sectional view illustrating a liquid crystal display (LCD) pixel according to an exemplary embodiment of the present invention. FIG. 2 is a circuit diagram illustrating a pixel circuit coupled to the LCD pixel of FIG. 1 according to an exemplary embodiment of the present invention.

Referring to FIG. 1, a liquid crystal display (LCD) pixel 100, which may be included in an LCD device, may include a first electrode 120, a second electrode 130, an insulation layer 140, and a slit electrode 150 on a first substrate 110. The slit electrode 150 may include a first slit electrode 152 and a second slit electrode 154. A second substrate 160 may be disposed opposite to or across from the first substrate 110. An upper-plate common electrode 170 may be formed or disposed on the second substrate 160. In an example, at least one of the first substrate 110 and the second substrate 160 may be a hard substrate that includes hard materials, such as glass, quartz, acryl, polycarbonate, etc., or a combination thereof. Further, at least one of the first substrate 110 and the second substrate 160 may be a flexible substrate that includes flexible materials, such as epoxy, polyethylene terephthalate (PET), acryl, silicon, etc., or a combination thereof. At least one of the first electrode 120, the second electrode 130, the slit electrode 150, and the upper-plate common electrode 170 may include metal, alloy, conductive metal oxide material, transparent conductive material, etc., or a combination thereof. For example, at least one of the first electrode 120, the second electrode 130, the slit electrode 150, and the upper-plate common electrode 170 may include titanium (Ti), molybdenum titanium alloy (MoTi), indium tin oxide (ITO), indium zinc oxide (IZO), etc., or a combination thereof.

At least one of the first electrode 120, the second electrode 130, and the upper-plate common electrode 170 may be formed or configured as a plate shape having one face, respectively. The slit electrode 150 may be formed or configured to have a fine slit pattern. The slit electrode 150 may include the first slit electrode 152 and the second slit electrode 154. The insulation layer 140 may include an inorganic material, such as silicon nitride (SiNx), silicon oxide (SiOx), etc., or a combination thereof. Further, the insulation layer 140 may include an organic material, such as acrylate resin, etc., or a combination thereof. The LCD pixel 100 may include the liquid crystal layer 180 having liquid crystal molecules 182 that are interposed between the slit electrode 150 and the upper-plate common electrode 170. The liquid crystal molecules 182 may be tilted, arranged, configured, or controlled by or according to a vertical electric field that may be generated by a potential difference between the slit electrode 150 and the upper-plate common electrode 170. The LCD pixel 100 may be separated into multiple regions and driven by the multiple regions having different vertical electric fields, which may be generated based on arrangements or configurations of at least one of the first electrode 120, the second electrode 130, the first slit electrode 152, the second slit electrode 154, and the upper-plate common electrode 170.

Referring again to FIG. 1, the LCD pixel 100 may be divided into a first region I having the first slit electrode 152 disposed on the insulation layer 140, a second region II having a first double-electrode 192 that includes the first electrode 120 and the second slit electrode 154, a third region III having the second slit electrode 154, and a fourth region IV having a second double-electrode 194 that includes the second electrode 130 and the second slit electrode 154. Although four regions are illustrated for the LCD pixel, aspects of the invention are not limited thereto, such that less or more than four regions may be present in the LCD pixel. The liquid crystal molecules 182 in the first region I may be tilted, arranged, configured, or controlled by the potential difference between a voltage applied to the first slit electrode 152 and a voltage applied to the upper-plate common electrode 170. The liquid crystal molecules 182 in the second region II may be tilted, arranged, configured, or controlled by the potential difference between a voltage applied to the first double-electrode 192 and a voltage applied to the upper-plate common electrode 170. The liquid crystal molecules 182 in the third region III may be tilted, arranged, configured, or controlled by the potential difference between a voltage applied to the second slit electrode 154 and a voltage applied to the upper-plate common electrode 170. The liquid crystal molecules 182 in the fourth region IV may be tilted, arranged, configured, or controlled by the potential difference between a voltage applied to the second double-electrode 194 and a voltage applied to the upper-plate common electrode 170.

The LCD pixel 100 may be coupled to a pixel circuit 200 of FIG. 2, which may provide voltages for tilting, arranging, configuring, or controlling the liquid crystal molecules 182 of the liquid crystal layer 180. Referring to FIG. 2, the pixel circuit 200 may include a data line 220, a gate line 240, a first thin film transistor T1, a first capacitor C1, a second thin film transistor T2, a third thin film transistor T3, and a second capacitor C2. The data line 220 may provide a data signal. The gate line 240 may provide a gate signal. Each of the first thin film transistor T1 and the second thin film transistor T2 may be coupled to the data line 220 and the gate line 240. The third thin film transistor T3 may be coupled to an output terminal of the second thin film transistor T2 and the gate line 240. When a gate-on signal is provided through the gate line 240, the first thin film transistor T1, the second thin film transistor T2, and the third thin film transistor T3 may be turned on. Thus, a data voltage that is provided through the data line 220 may be applied to the first thin film transistor T1 and the second thin film transistor T2.

The data voltage applied to the second thin film transistor T2 may be divided by the third thin film transistor T3. Thus, a voltage that charges the first capacitor C1 and a voltage that charges the second capacitor C2 may be different from each other. The voltage that charges the first capacitor C1 may be referred to as a first data voltage. The voltage that charges the second capacitor C2 may be referred to as a second data voltage. According to aspects of the invention, a level of the first data voltage may be higher than a level of the second data voltage because the first data voltage is applied through the first thin film transistor T1, and the second data voltage is divided by the second thin film transistor T2 and the third thin film transistor T3.

The first slit electrode 152 may be coupled to the first capacitor C1, and the first data voltage may be applied to the first slit electrode 152 in the first region I. An upper-plate common voltage having a constant level may be applied to the upper-plate common electrode 170. The vertical electric field that is generated by the potential difference between the first data voltage and the upper-plate common voltage in the first region I may be referred to as a first vertical electric field. The liquid crystal molecules 182 in the first region I may be tilted, arranged, or configured in a predetermined angle by or according to the first vertical electric field.

The first electrode 120 and the second slit electrode 154 may be arranged to overlap each other, at least in part, to form the first double-electrode 192 in the second region II. The first electrode 120 may be coupled to the first capacitor C1, and the second slit electrode 154 may be coupled to the second capacitor C2. The first data voltage may be applied to the first electrode 120, and the second data voltage may be applied to the second slit electrode 154. The upper-plate common voltage having the constant level may be applied to the upper-plate common electrode 170. The vertical electric field that is generated by the potential difference between the voltage applied to the first double-electrode 192 and the upper-plate common voltage in the second region II may be referred to as a second vertical electric field. The voltage applied to the first double-electrode 192 in the second region II may be lower than the first data voltage applied to the first slit electrode 152 in the first region I. Thus, the second vertical electric field may have a higher potential difference compared to the first vertical electric field.

The second slit electrode 154 may be coupled to the second capacitor C2, and the second data voltage may be applied to the second slit electrode 154 in the third region III. The upper-plate common voltage having the constant level may be applied to the upper-plate common electrode 170. The vertical electric field that is generated by the potential difference between the second data voltage and the upper-plate common voltage in the third region III may be referred to as a third vertical electric field. The second data voltage applied to the second slit electrode 154 in the third region III may be lower than the voltage applied to the first double-electrode 192 of the second region II. Thus, the third vertical electric field may have a higher potential difference compared to the second vertical electric field.

The second electrode 130 and the second slit electrode 154 may be arranged to overlap each other, at least in part, to form the second double-electrode 194 in the fourth region IV. The second slit electrode 154 may be coupled to the second capacitor C2. The second capacitor C2 may provide the second data voltage to the second slit electrode 154. According to aspects of the invention, the second electrode 130 may be coupled to a lower-plate common electrode. The lower-plate common electrode may be formed or disposed on the first substrate 110. The lower-plate common electrode may provide a lower-plate common voltage having a constant level. In an example, the lower-plate common voltage may be lower than the second data voltage. Further, the second electrode 130 may be coupled to a shielding electrode (not illustrated). The shielding electrode may be formed or disposed to overlap the data line 220 to prevent or impede a parasitic capacitance that may occur between the pixel electrode and the data line 220. The shielding electrode may be formed or disposed above or within a reference proximity of the data line. A predetermined voltage having a constant level may be applied to the shielding electrode. In an example, the voltage applied to the shielding electrode may be lower than the second data voltage. The upper-plate common voltage having the constant level may be applied to the upper-plate common electrode 170. The vertical electric field that is generated by the potential difference between the voltage applied to the second double-electrode 194 and the upper-plate common voltage in the fourth region IV may be referred to as a fourth vertical electric field. The voltage applied to the second double-electrode 194 in the fourth region IV may be lower than the second data voltage of the third region III. Thus, the fourth vertical electric field may have a higher potential difference compared to the third vertical electric field.

As described above, the LCD pixel 100 may be divided into four regions (e.g., the first region I, the second region II, the third region III, and the fourth region IV) and driven by applying voltages having different levels to the first electrode 120, the second electrode 130, and the slit electrode 150 that are included in each of the four regions. The first vertical electric field through the fourth vertical electric field that have different potential differences may be formed or generated in each of the four regions because the voltages that are applied to the first electrode 120, the second electrode 130, and the slit electrode 150 in the four regions may be different from each other. More specifically, the first vertical electric field that tilts, arranges, or configures the liquid crystal molecules at the predetermined angle may be formed or generated in the first region I. The second vertical electric field that may have a higher potential difference compared to the first vertical electric field may be formed or generated in the second region II. The third vertical electric field that may have a higher potential difference compared to the second vertical electric field may be formed or generated in the third region III. The fourth vertical electric field that may have a higher potential difference compared to the third vertical electric field may be formed or generated in the fourth region IV. Slope angles at which the liquid crystal molecules may be tilted, arranged, or configured by the first through fourth vertical electric fields generated in the four regions (e.g., the first region I, the second region II, the third region III, and the fourth region IV) may be different from each other. Thus, a side-view visibility of the LCD device may be improved.

Figure 3:
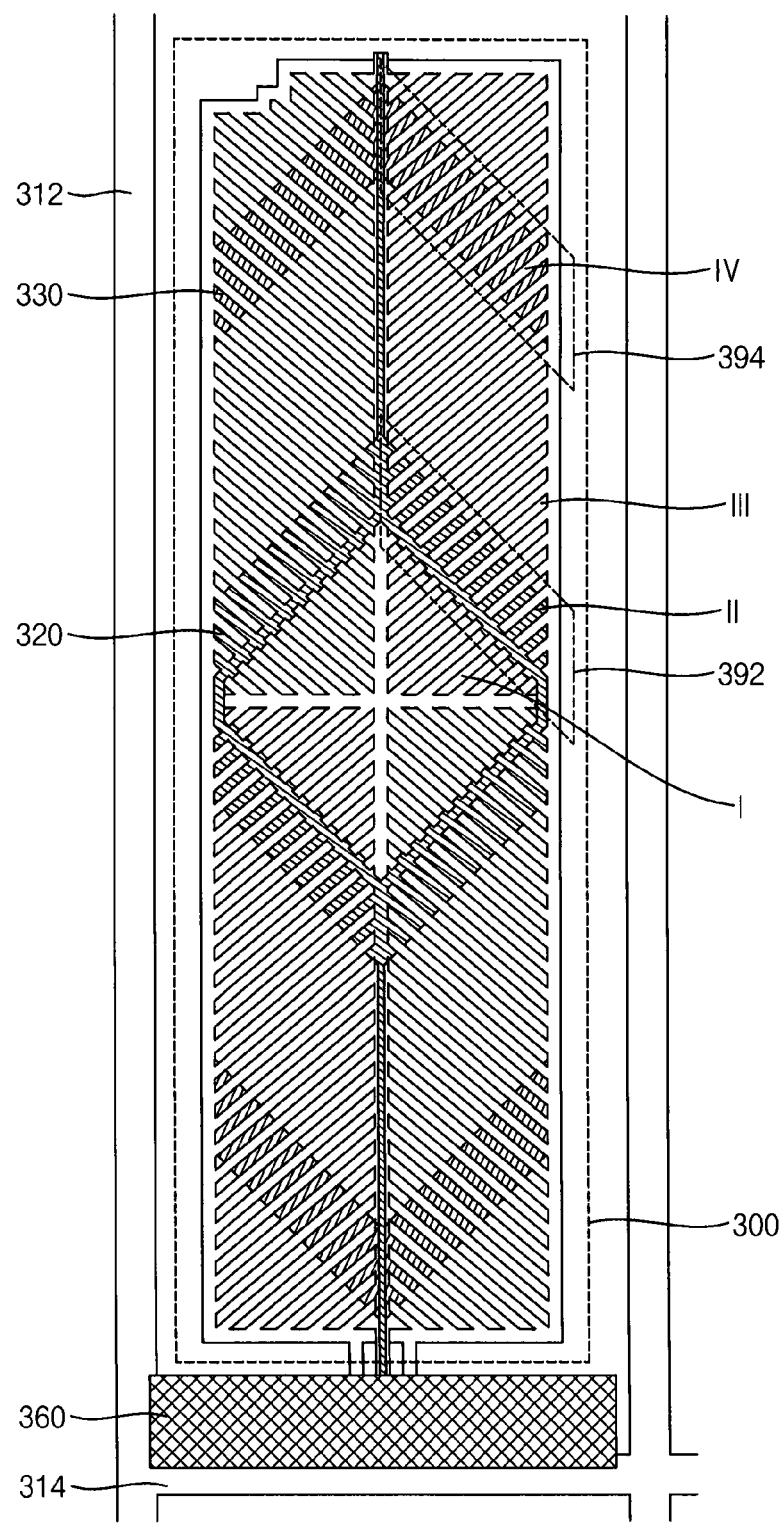
FIG. 3 is a plane view illustrating an LCD pixel according to an exemplary embodiment of the present invention.
Figure 4:
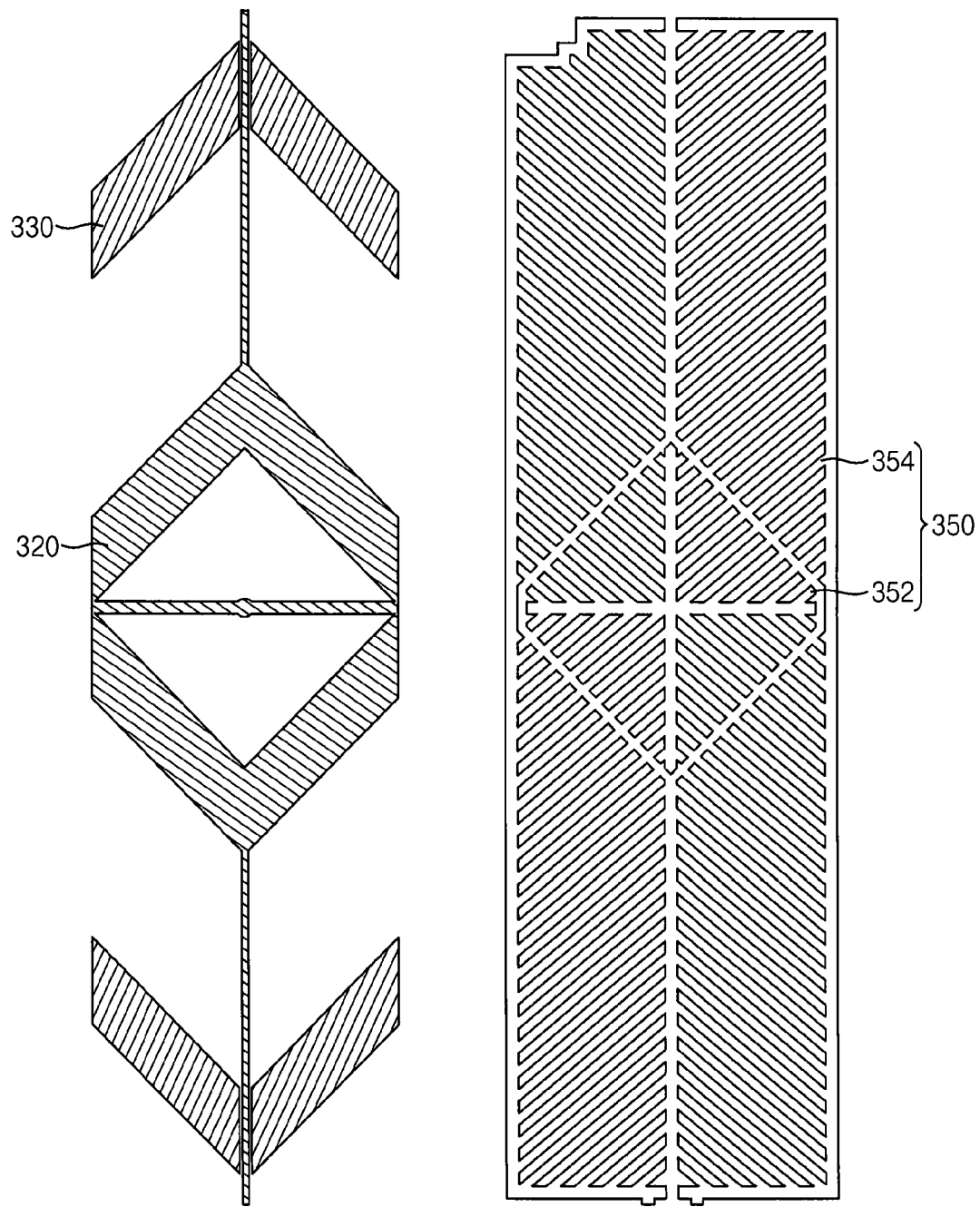
FIG. 4 is an exploded view illustrating the LCD pixel of FIG. 3.

FIG. 3 is a plane view illustrating an LCD pixel according to an exemplary embodiment of the present invention. FIG. 4 is an exploded view illustrating the LCD pixel of FIG. 3.

Referring to FIG. 3 and FIG. 4, a first electrode 320, a second electrode 330, and a slit electrode 350 are illustrated. An LCD pixel 300 and a pixel circuit 360, which may drive the LCD pixel 300, may be arranged in a region where a data line 312 and a gate line 314 are crossed. The LCD pixel 300 may include a first region I in which a first vertical electric field may be generated, a second region II in which a second vertical electric field may be generated, a third region III in which a third vertical electric field may be generated, and a fourth region IV in which a fourth vertical electric field may be generated.

More specifically, a first slit electrode 352 may be arranged in the first region I. The first slit electrode 352 may be formed or configured to have a fine slit pattern. According aspects of the invention, the liquid crystal display pixel 300 may have a single-electrode structure that includes the first slit electrode 352 in the first region I. The slit electrode 350 may have the fine slit pattern. The slit electrode 350 may include the first slit electrode 352 and a second slit electrode 354. The first slit electrode 352 and the second slit electrode 354 may be electrically separated. The first slit electrode 352 may be electrically coupled to the first electrode 320 through a contact hole. A first data voltage may be applied to the first slit electrode 352 of a first substrate, and an upper-plate common voltage may be applied to an upper-plate common electrode of a second substrate. The first vertical electric field may be formed or generated by a potential difference between a voltage applied to the first slit electrode 352 of the first substrate and a voltage applied to the upper-plate common electrode of the second substrate in the first region I. Liquid crystal molecules in the first region I may be tilted, arranged, or configured at a predetermined angle by or according to the first vertical electric field.

The first electrode 320 and the second slit electrode 352, which may be disposed above the first electrode 320, may be arranged in the second region II. An insulation layer may be formed or arranged between the first electrode 320 and the second slit electrode 352. In an example, a first double-electrode 392 may be formed by overlapping the first electrode 320 and the second slit electrode 352 in the second region II. The first electrode 320 may be formed or disposed in a plate shape having one face. The second slit electrode 354 may be formed, disposed, or arranged in the fine slit pattern. In an example, the first electrode 320 may be coupled to a first capacitor C1, and the second slit electrode 354 may be coupled to a second capacitor C2. Thus, the first data voltage may be applied to the first electrode 320, a second data voltage may be applied to the second slit electrode 354, and the upper-plate common voltage may be applied to the upper-plate common electrode. The second vertical electric field may be formed or generated by a potential difference between a voltage applied to the first double-electrode 392 of the first substrate and a voltage applied to the upper-plate common electrode of the second substrate in the second region II. The voltage applied to the first double-electrode 392 may be lower than the first data voltage applied to the first slit electrode 352 in the first region I. Thus, the second vertical electric field may have a higher potential difference compared to the first vertical electric field. Liquid crystal molecules in the second region II may be tilted, arranged, or configured by or according to the second vertical electric field.

The second slit electrode 354 may be arranged in the third region III. The second slit electrode 354 may be formed or configured to have a fine slit pattern. According to aspects of the invention, the liquid crystal display pixel 300 may have the single-electrode structure that includes the second slit electrode 354 in the third region III. The second data voltage may be applied to the second slit electrode 354 and the upper-plate common voltage may be applied to the upper-plate common electrode. The third vertical electric field may be formed or generated by a potential difference between a voltage applied to the second slit electrode 354 of the first substrate and a voltage applied to the upper-plate common electrode of the second substrate in the third region III. The second data voltage applied to the second slit electrode 354 may be lower than the voltage applied to the first double-electrode 392 in the second region II. Thus, the third vertical electric field may have a higher potential difference compared to the second vertical electric field. Liquid crystal molecules in the third region III may be tilted, arranged, or configured by or according to the third vertical electric field.

The second electrode 330 and the second slit electrode 354, which may be disposed above the second electrode 330, may be arranged in the fourth region IV. The insulation layer may be formed or arranged between the second electrode 330 and the second slit electrode 354. According to aspects of the invention, a second double-electrode 394 may be formed by overlapping the second electrode 330 and the second slit electrode 354 in the fourth region IV. The second electrode 330 may be formed or disposed in the plate shape having one face. The second slit electrode 354 may be formed or configured to have a fine slit pattern. According to aspects of the invention, the second electrode 330 may be coupled to a lower-plate common electrode and the second slit electrode 354 may be coupled to the second capacitor C2. The lower-plate common electrode may be formed or disposed on the first substrate. A lower-plate common voltage having a constant level may be applied to the lower-plate common electrode. The lower-plate common voltage may be lower than the second data voltage. Thus, the lower-plate common voltage may be applied to the second electrode 330, the second data voltage may be applied to the second slit electrode 354, and the upper-plate common voltage may be applied to the upper-plate common electrode. The fourth vertical electric field may be formed or generated by a potential difference between a voltage applied to the second double-electrode 394 of the first substrate and a voltage applied to the upper-plate common electrode of the second substrate in the fourth region IV. The voltage applied to the second double-electrode 394 may be lower than the second data voltage applied to the second slit electrode 354 in the third region III. Thus, the fourth vertical electric field may have a higher potential difference compared to the third vertical electric field. Liquid crystal molecules in the fourth region IV may be tilted, arranged, or configured by or according to the fourth vertical electric field.

Arrangements of the first electrode 320, the second electrode 330, and the slit electrode 350 may not be limited to the exemplary embodiments of FIG. 3 and FIG. 4. The first electrode 320, the second electrode 330, and the slit electrode 350 may have various structures that may generate first vertical electric field in the first region I, the second vertical electric field in the second region II, the third vertical electric field in the third region III, and the fourth vertical electric field in the fourth region IV of FIG. 1.

The pixel circuit 360 may have various structures that implement the pixel circuit 200 of FIG. 2. The pixel circuit 360 may provide data signals for driving the LCD pixel 300. More specifically, the pixel circuit 360 may apply the data voltage that is provided through the data line 312 to the first thin film transistor T1 and the second thin film transistor T2. The data voltage applied to the second thin film transistor T2 may be divided by the third thin film transistor T3. The data voltage applied to the first thin film transistor T1 may be referred to as a first data voltage, and the data voltage applied to the second thin film transistor T2 and/or the third thin film transistor T3 may be referred to as a second data voltage. The first data voltage and the second data voltage that have different level of voltages may respectively charge the first capacitor C1 and the second capacitor C2. The level of the first data voltage may be higher than the level of the second data voltage because the first data voltage is the data voltage applied through the first thin film transistor T1, and the second data voltage is the data voltage divided by the second thin film transistor T2 and the third thin film transistor T3. The first data voltage stored in the first capacitor C1 may be applied to the first electrode 320 and the first slit electrode 352. The second data voltage stored in the second capacitor C2 may be applied to the second slit electrode 354. Thus, four different vertical electric fields may be generated based on potential voltage differences in the four regions (e.g., the first region I, the second region II, the third region III, and the fourth region IV) of the LCD pixel 300.

As described above, the LCD pixel 300 may be driven by dividing one pixel into the four regions (e.g., the first region I, the second region II, the third region III, and the fourth region IV). The different level of voltages may be applied to the first electrode 320, the second electrode 330, and slit electrode 350 that are included in each of the regions. Four vertical electric fields, each having different potential voltage differences, may be formed or generated because the level of the voltages that are applied to the first electrode 320, the second electrode 330, and the slit electrode 350 included in the four regions are different from each other. Slope angles at which the liquid crystal molecules may be tilted, arranged, or configured by or according to the vertical electric fields of the four regions may be different for each region. Thus, a side-view visibility of the LCD device may be improved.

Figure 5:
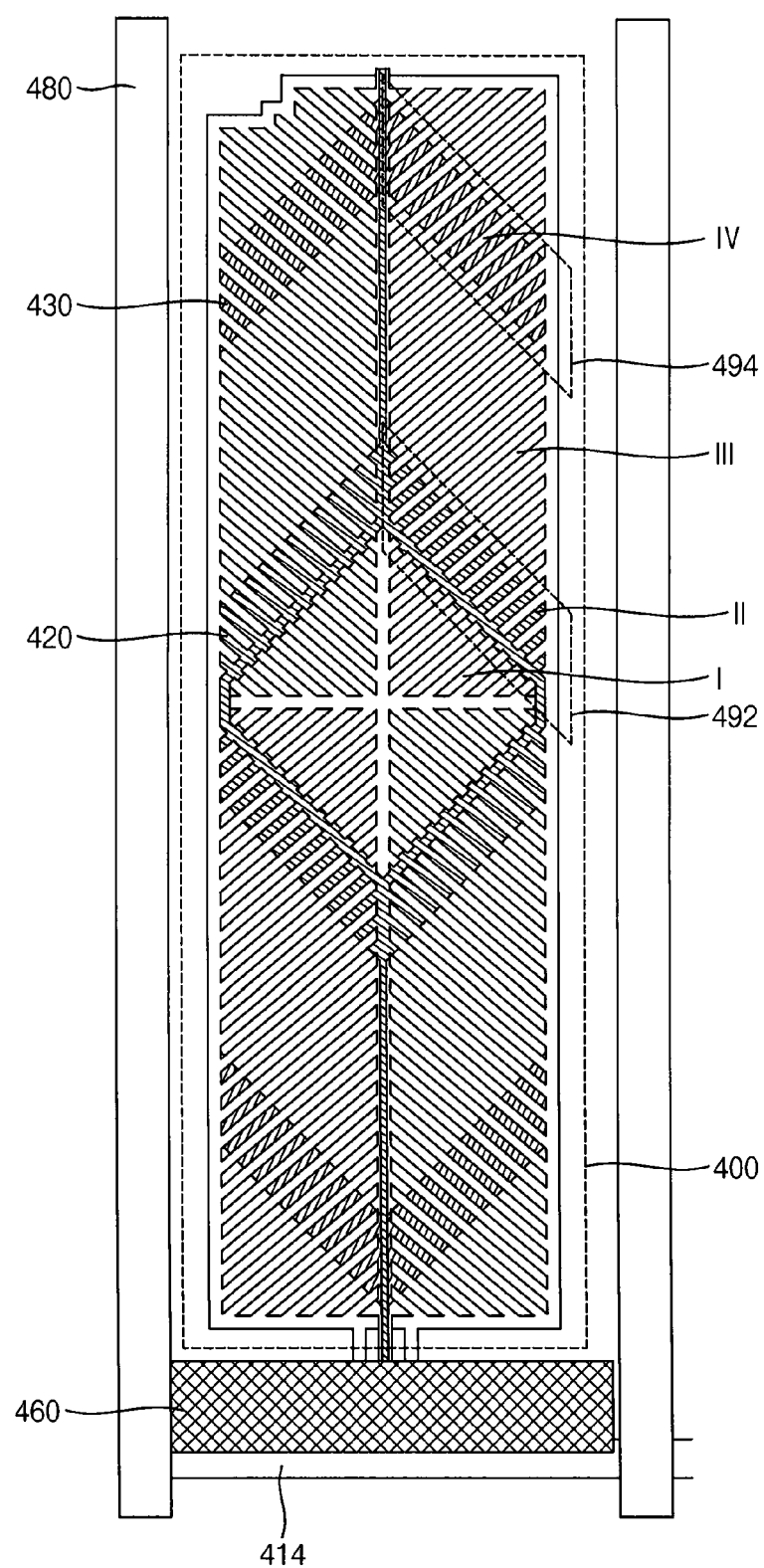
FIG. 5 is a plane view illustrating an LCD pixel according to an exemplary embodiment of the present invention.
Figure 6:
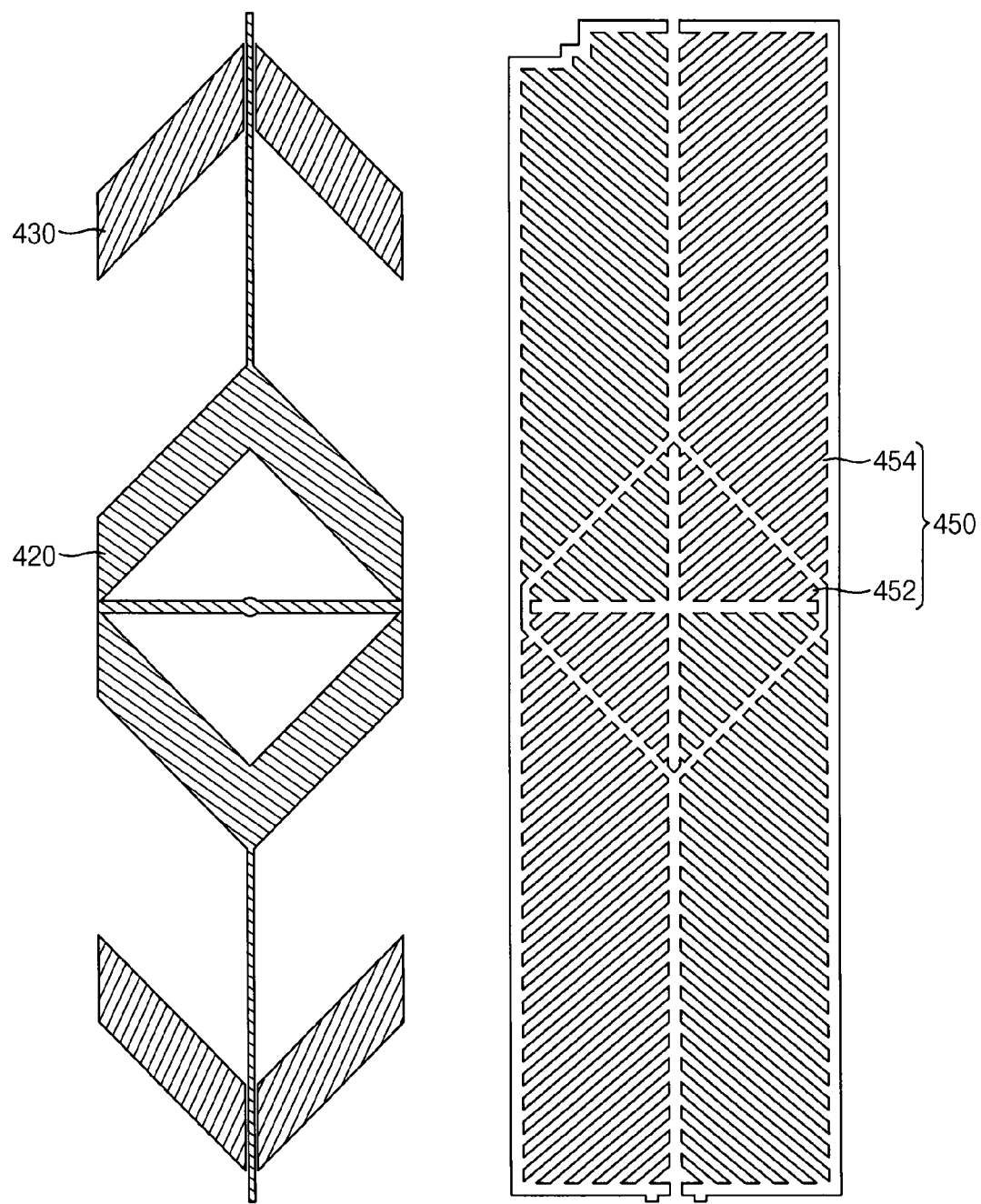
FIG. 6 is an exploded view illustrating the LCD pixel of FIG. 5.

FIG. 5 is a plane view illustrating an LCD pixel according to exemplary embodiments of the present invention. FIG. 6 is an exploded view illustrating the LCD pixel of FIG. 5. The LCD pixel 400 of FIG. 5 and FIG. 6 may be similar to the LCD pixel 300 of FIG. 3 and FIG. 4 with an exception that a shielding electrode 480 is formed, disposed, or arranged above a data line. Thus, duplicated description will not be repeated.

Referring to FIG. 5 and FIG. 6, the LCD pixel 400 may include a shielding electrode 480. The shielding electrode 480 may be formed or configured to prevent or impede a parasitic capacitance that may occur between a pixel electrode and the data line. The shielding electrode 480 may block or impede an electric field that may be generated between the pixel electrode and the data line. The shielding electrode 480 may include metal, alloy, conductive metal oxide material, transparent conductive material, etc., or a combination thereof. For example, the shielding electrode 480 may include titanium, molybdenum titanium alloy, indium tin oxide, indium zinc oxide, etc., or a combination thereof. The shielding electrode 480 may be formed, arranged, or disposed above the data line. However, aspects of the invention are not limited thereto, such that the shielding electrode may be disposed elsewhere within a reference proximity of the data line.

A second electrode 430 and a second slit electrode 454 that is disposed above the second electrode 430 may be arranged in the fourth region IV. An insulation layer may be formed or arranged between the second electrode 430 and the second slit electrode 454. According to aspects of the invention, a second double-electrode 494 may be formed by overlapping, at least in part, the second electrode 430 and the second slit electrode 454 in the fourth region IV. The second electrode 430 may be formed or configured as a plate shape having one face. The second slit electrode 453 may be formed or configured to have a fine slit pattern. According to aspects of the invention, the second electrode 430 may be coupled to the shielding electrode 480 and the second slit electrode 454 may be coupled to the second capacitor C2. The shielding electrode 480 may be formed or arranged above the data line. A voltage having a constant level may be applied to the shielding electrode 480. In an example, the voltage applied to the shielding electrode 480 may be lower than the second data voltage. Thus, the same voltage that is applied to the shielding electrode 480 may be applied to the second electrode 430, the second data voltage may be applied to the second slit electrode 454, and an upper-plate common voltage may be applied to an upper-plate common electrode. The fourth vertical electric field may be formed or generated by a potential difference between a voltage applied to the second double-electrode 494 of the first substrate and a voltage applied to the upper-plate common electrode of the second substrate in the fourth region IV. The voltage applied to the second double-electrode 494 may be lower than the second data voltage applied to the second slit electrode 454 of the third region III. Thus, the fourth vertical electric field may have a higher potential difference compared to the third vertical electric field. Liquid crystal molecules in the fourth region IV may be tilted, arranged, or configured by or according to the fourth vertical electric field.

Arrangements of the first electrode 420, the second electrode 430, and the slit electrode 450 may not be limited to exemplary embodiments of FIG. 5 and FIG. 6. The first electrode 420, the second electrode 430, and the slit electrode 450 may have various structures that may generate the first vertical electric field in the first region I, the second vertical electric field in the second region II, the third vertical electric field in the third region III, and the fourth vertical electric field in the fourth region IV of FIG. 1.

Figure 7:
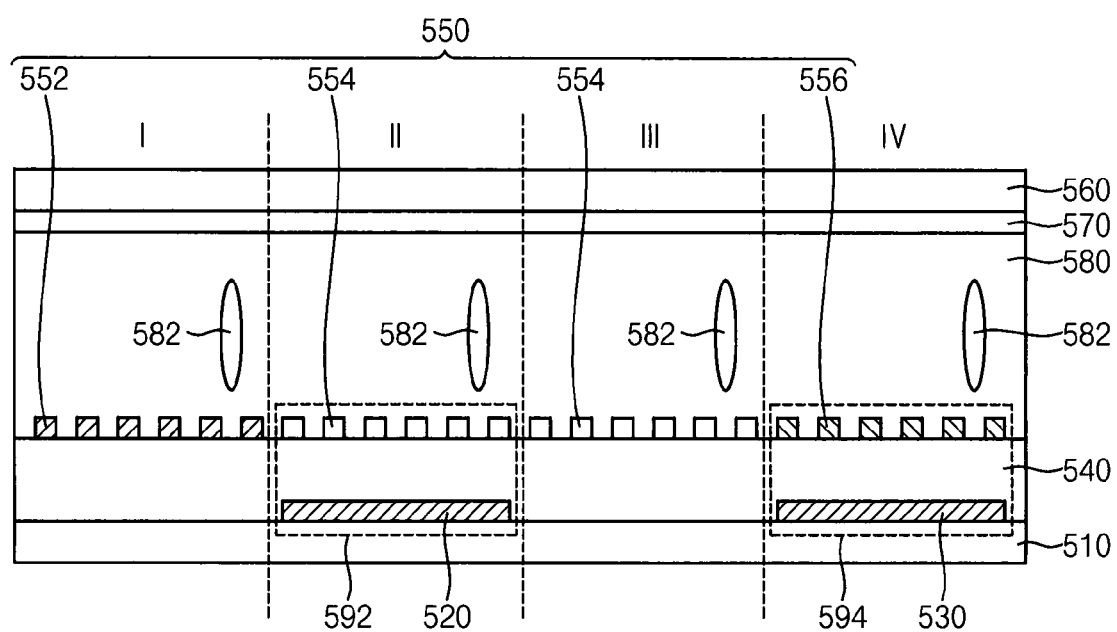
FIG. 7 is a cross-sectional view illustrating a liquid crystal display (LCD) pixel according to an exemplary embodiment of the present invention.

FIG. 7 is a cross-sectional view illustrating a liquid crystal display (LCD) pixel according to an exemplary embodiment of the present invention.

Referring to FIG. 7, a liquid crystal display (LCD) pixel 500 included in an LCD device may include a first electrode 520, the second electrode 530, an insulation layer 540, and slit electrode 550, all of which may be disposed on a first substrate 510. The slit electrode 550 may include a first slit electrode 552, a second slit electrode 554, and a third slit electrode 556. A second substrate 560 may be disposed opposite to or across from the first substrate 510. An upper-plate common electrode 570 may be formed, arranged, or disposed on the second substrate 560. In an example, at least one of the first substrate 510 and the second substrate 560 may be a hard substrate that includes hard materials, such as glass, quartz, acryl, polycarbonate, etc., or a combination thereof. Further, at least one of the first substrate 510 and the second substrate 560 may be a flexible substrate that includes flexible materials, such as epoxy, polyethylene terephthalate, acryl, silicon, etc., or a combination thereof. At least one of the first electrode 520, the second electrode 530, the slit electrode 550, and the upper-plate common electrode 570 may include metal, alloy, conductive metal oxide material, transparent conductive material, etc., or a combination thereof. For example, at least one of the first electrode 520, the second electrode 530, the slit electrode 550, and the upper-plate common electrode 570 may include titanium (Ti), molybdenum titanium alloy (MoTi), indium tin oxide (ITO), indium zinc oxide (IZO), etc., or a combination thereof.

At least one of the first electrode 520, the second electrode 530, and the upper-plate common electrode 570 may be formed or configured as a plate shape having one face, respectively. The slit electrode 550 may be formed or configured to have a fine slit pattern. The slit electrode 550 may include the first slit electrode 552, the second slit electrode 554, and the third slit electrode 556. The insulation layer 540 may include an inorganic material such as silicon nitride (SiNx), silicon oxide (SiOx), etc., or a combination thereof. Further, the insulation layer 540 may include an organic material, such as acrylate resin, etc., or a combination thereof. The LCD pixel 500 may include the liquid crystal layer 580 having liquid crystal molecules 582 that are interposed between the slit electrode 550 and the upper-plate common electrode 570. The liquid crystal molecules 582 may be tilted, arranged, configured, or controlled by or according to a vertical electric field that may be formed or generated by a potential difference between the slit electrode 550 and the upper-plate common electrode 570. The LCD pixel 100 may be driven by a plurality of regions having different vertical electric fields, which may be formed or generated based on arrangements or configurations of at least one of the first electrode 520, the second electrode 530, the first slit electrode 552, the second slit electrode 554, the third slit electrode 556, and the upper-plate common electrode 570.

Referring again to FIG. 7, the LCD pixel 500 may be divided into a first region I having the first slit electrode 552 disposed on the insulation layer 540, a second region II having a first double-electrode 592 that includes the first electrode 520 and the second slit electrode 554, a third region III having the second slit electrode 554, and a fourth region IV having a second double-electrode 594 that includes the second electrode 530 and the third slit electrode 556. The liquid crystal molecules 582 in the first region I may be tilted, arranged, configured, or controlled by the potential difference between a voltage applied to the first slit electrode 552 and a voltage applied to the upper-plate common electrode 570. The liquid crystal molecules 582 in the second region II may be tilted, arranged, configured, or controlled by the potential difference between a voltage applied to the first double-electrode 592 and a voltage applied to the upper-plate common electrode 570. The liquid crystal molecules 582 in the third region III may be tilted, arranged, configured, or controlled by the potential difference between a voltage applied to the second slit electrode 554 and a voltage applied to the upper-plate common electrode 570. The liquid crystal molecules 582 in the fourth region IV may be tilted, arranged, configured, or controlled by the potential difference between a voltage applied to the second double-electrode 594 and a voltage applied to the upper-plate common electrode 570.

The LCD pixel 500 may be coupled to a pixel circuit, which may provide voltages for tilting, arranging, configuring, or controlling the liquid crystal molecules 582 of the liquid crystal layer 580. The pixel circuit may be substantially the same as or similar to the pixel circuit 200 of FIG. 2.

The first slit electrode 552 may be coupled to the first capacitor C1, and the first data voltage may be applied to the first slit electrode 552 in the first region I. An upper-plate common voltage having a constant level may be applied to the upper-plate common electrode 570. The vertical electric field that is generated by the potential difference between the first data voltage and the upper-plate common voltage in the first region I may be referred to as a first vertical electric field. The liquid crystal molecules 582 in the first region I may be tilted, arranged, or configured in a predetermined angle by or according to the first vertical electric field.

The first electrode 520 and the second slit electrode 554 may be overlapped, at least in part, to form the first double-electrode 592 in the second region II. The first electrode 520 may be coupled to the first capacitor C1, and the second slit electrode 554 may be coupled to the second capacitor C2. The first data voltage may be applied to the first electrode 520, and the second data voltage may be applied to the second slit electrode 554. The upper-plate common voltage having the constant level may be applied to the upper-plate common electrode 570. The vertical electric field that is generated by the potential difference between the voltage applied to the first double-electrode 592 and the upper-plate common voltage in the second region II may be referred to as a second vertical electric field. In an example, the voltage applied to the first double-electrode 592 in the second region II may be lower than the first data voltage applied to the first slit electrode 552 in the first region I. Thus, the second vertical electric field may have a higher potential difference compared to the first vertical electric field.

The second slit electrode 554 may be coupled to the second capacitor C2, and the second data voltage may be applied to the second slit electrode 554 in the third region III. The upper-plate common voltage having the constant level may be applied to the upper-plate common electrode 570. The vertical electric field that is generated by the potential difference between the second data voltage and the upper-plate common voltage in the third region III may be referred to as a third vertical electric field. The second data voltage applied to the second slit electrode 554 in the third region III may be lower than the voltage applied to the first double-electrode 592 of the second region II. Thus, the third vertical electric field may have a higher potential difference compared to the second vertical electric field.

The second electrode 530 and the third slit electrode 556 may be overlapped to form the second double-electrode 594 in the fourth region IV. The second electrode 530 may be coupled to the first capacitor C1. The first capacitor C1 may provide the first data voltage to the second electrode 530. According to aspects of the invention, the third slit electrode 556 may be coupled to a lower-plate common electrode. The lower-plate common electrode may be formed or disposed on the first substrate 510. The lower-plate common electrode may provide a lower-plate common voltage having a constant level. The lower-plate common voltage may be lower than the second data voltage.

According to aspects of the invention, the third slit electrode 556 may be coupled to a shielding electrode. The shielding electrode may overlap, at least in part, the data line and may prevent or protect against a parasitic capacitance that may occur between the pixel electrode and the data line. The shielding electrode may be formed or arranged above the data line. A predetermined voltage having a constant level may be applied to the shielding electrode. In an example, the voltage applied to the shielding electrode may be lower than the second data voltage. The upper-plate common voltage having the constant level may be applied to the upper-plate common electrode 570. The vertical electric field that is generated by the potential difference between the voltage applied to the second double-electrode 594 and the upper-plate common voltage in the fourth region IV may be referred to as a fourth vertical electric field. The voltage applied to the second double-electrode 594 in the fourth region IV may be lower than the voltage applied to the first double-electrode 592 of the second region II, and may be higher than the second data voltage of the third region III. Thus, the fourth vertical electric field may have a higher potential difference compared to the second vertical electric field. Further, the fourth vertical electric field may have a lower potential difference compared to the third vertical electric field.

As described above, the LCD pixel 500 may be driven by dividing one pixel into four regions (e.g., the first region I, the second region II, the third region III, and the fourth region IV) and by applying different voltage levels to the first electrode 520, the second electrode 530, and the slit electrode 550 that are included each of the four regions. Four vertical electric fields of the four regions, which may have different potential differences, may be formed or generated in each of the four regions because the voltages that are applied to the first electrode 520, the second electrode 530, and the slit electrode 550 in the four regions are different from each other. More specifically, the first vertical electric field that tilts, arranges, or configures the liquid crystal molecules at the predetermined angle may be formed or generated in the first region I, the second vertical electric field that has a higher potential difference compared to the first vertical electric field may be formed or generated in the second region II, and the third vertical electric field that has a higher potential difference compared to the second vertical electric field may be formed or generated in the third region III. The fourth vertical electric field that has a higher potential difference compared to the second vertical electric field and that has a lower potential difference compared to the third vertical electric field may be formed or generated in the fourth region IV. Slope angles at which the liquid crystal molecules may be tilted, arranged, or configured by or according to the four vertical electric fields may be different from each other in the four regions. Thus, a side-view visibility of the LCD device may be improved.

Figure 8:
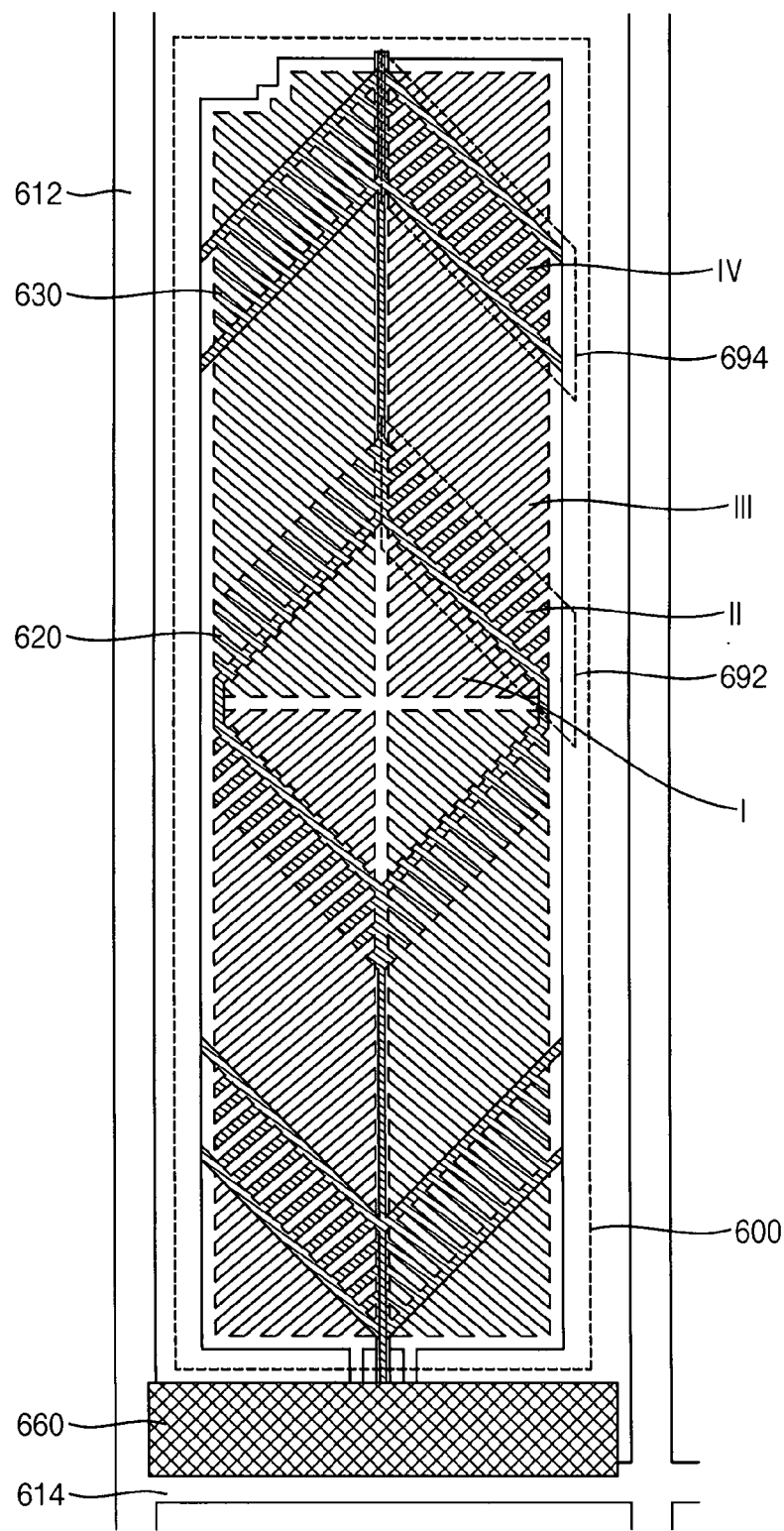
FIG. 8 is a plane view illustrating an LCD pixel according to an exemplary embodiment of the present invention.
Figure 9:
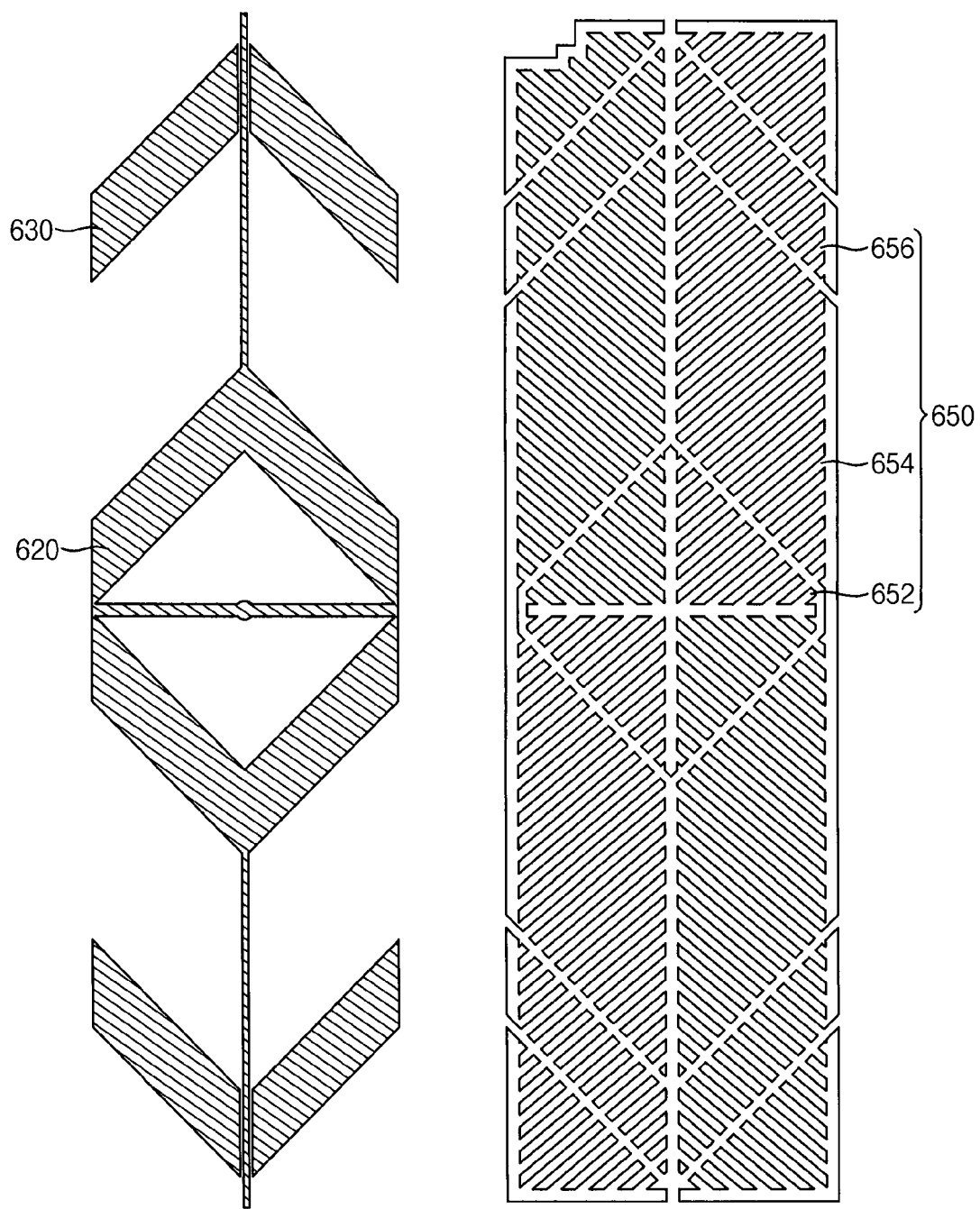
FIG. 9 is an exploded view illustrating the LCD pixel of FIG. 8.

FIG. 8 is a plane view illustrating an LCD pixel according to an exemplary embodiment of the present invention. FIG. 9 is an exploded view illustrating the LCD pixel of FIG. 8.

Referring to FIG. 8 and FIG. 9, a first electrode 620, and second electrode 630, and a slit electrode 650 are illustrated. An LCD pixel 600 and a pixel circuit 660, which may drive the LCD pixel 600, may be arranged in a region where a data line 612 and a gate line 614 are crossed. The LCD pixel 600 may include a first region I in which a first vertical electric field may be generated, a second region II in which a second vertical electric field may be generated, a third region III in which a third vertical electric field may be generated, and a fourth region IV in which a fourth vertical electric field may be generated.

More specifically, a first slit electrode 652 may be arranged in the first region I. The first slit electrode 652 may be formed or configured to have a fine slit pattern. According to aspects of the invention, the liquid crystal display pixel 600 may have a single-electrode structure that includes the first slit electrode 652 in the first region I. The slit electrode 650 may be formed or configured to have the fine slit pattern. The slit electrode 650 may include the first slit electrode 652, the second slit electrode 654, and the third slit electrode 656. The first slit electrode 652, the second slit electrode 654, and the third slit electrode 656 may be electrically separated. The first slit electrode 652 in the first region I may be electrically coupled to the first electrode 620 and the second electrode 630 through a contact hole. A first data voltage may be applied to the first slit electrode 652, and an upper-plate common voltage may be applied to an upper-plate common electrode. The first vertical electric field may be formed or generated by a potential difference between a voltage applied to the first slit electrode 652 of the first substrate and a voltage applied to the upper-plate common electrode of the second substrate in the first region I. Liquid crystal molecules in the first region I may be tilted, arranged, or configured at a predetermined angle by or according to the first vertical electric field.

The first electrode 620 and the second slit electrode 652, which may be disposed above the first electrode 620, may be arranged in the second region II. An insulation layer may be formed or arranged between the first electrode 620 and the second slit electrode 652. In an example, a first double-electrode 692 may be formed by overlapping the first electrode 620 and the second slit electrode 652 in the second region II. The first electrode 620 may be formed or disposed in a plate shape having one face. The second slit electrode 654 may be formed, disposed or arranged in the fine slit pattern. In an example, the first electrode 620 may be coupled to a first capacitor C1 and the second slit electrode 654 may be coupled to a second capacitor C2. Thus, the first data voltage may be applied to the first electrode 620, a second data voltage may be applied to the second slit electrode 654, and the upper-plate common voltage may be applied to the upper-plate common electrode. The second vertical electric field may be formed or generated by a potential difference between a voltage applied to the first double-electrode 692 of the first substrate and a voltage applied to the upper-plate common electrode of the second substrate in the second region II. The voltage applied to the first double-electrode 692 may be lower than the first data voltage applied to the first slit electrode 652 in the first region I. Thus, the second vertical electric field may have a higher potential difference compared to the first vertical electric field. Liquid crystal molecules in the second region II may be tilted, arranged, or configured by or according to the second vertical electric field.

The second slit electrode 654 may be arranged in the third region III. The second slit electrode 654 may be formed or configured to have a fine slit pattern. According to aspects of the invention, the liquid crystal display pixel 600 may have the single-electrode structure that includes the second slit electrode 654 in the third region III. The second data voltage may be applied to the second slit electrode 654 and the upper-plate common voltage may be applied to the upper-plate common electrode. The third vertical electric field may be formed or generated by a potential difference between a voltage applied to the second slit electrode 654 of the first substrate and a voltage applied to the upper-plate common electrode of the second substrate in the third region III. The second data voltage applied to the second slit electrode 654 may be lower than the voltage applied to the first double-electrode 692 in the second region II. Thus, the third vertical electric field may have a higher potential difference compared to the second vertical electric field. Liquid crystal molecules in the third region III may be tilted, arranged, or configured by or according to the third vertical electric field.

The second electrode 630 and the third slit electrode 656, which may be disposed above the second electrode 630, may be arranged in the fourth region IV. The insulation layer may be formed or arranged between the second electrode 630 and the third slit electrode 656. According to aspects of the invention, a second double-electrode 694 may be formed by overlapping the second electrode 630 and the third slit electrode 654 in the fourth region IV. The second electrode 630 may be formed or disposed in the plate shape having one face. The third slit electrode 654 may be formed or configured to have a fine slit pattern. The third slit electrode 656 may be electrically separated from the first slit electrode 652 and the second slit electrode 654. According to aspects of the invention, the second electrode 630 may be coupled to the first capacitor, and the third slit electrode 656 may be coupled to a lower-plate common electrode. The lower-plate common electrode may be formed or disposed on the first substrate. A lower-plate common voltage having a constant level may be applied to the lower-plate common electrode. In an example, the lower-plate common voltage may be lower than the second data voltage. Thus, the first data voltage may be applied to the second electrode 630, the lower-plate common voltage may be applied to the third slit electrode 656, and the upper-plate common voltage may be applied to the upper-plate common electrode. The fourth vertical electric field may be formed or generated by a potential difference between a voltage applied to the second double-electrode 694 of the first substrate and a voltage applied to the upper-plate common electrode of the second substrate in the fourth region IV. The voltage applied to the second double-electrode 694 may be lower than the voltage applied to the first double-electrode 692 of the second region II and may be higher than the second data voltage applied to the second slit electrode 654 in the third region III. Thus, the fourth vertical electric field may have a higher potential difference compared to the second vertical electric field and may have a lower potential difference compared to the third vertical electric field. Liquid crystal molecules in the fourth region IV may be tilted, arranged, or configured by or according to the fourth vertical electric field.

Arrangements of the first electrode 620, the second electrode 630, and the slit electrode 650 may not be limited to the exemplary embodiments of FIG. 8 and FIG. 9. The first electrode 620, the second electrode 630, and the slit electrode 650 may have various structures that may generate the first vertical electric field in the first region I, the second vertical electric field in the second region II, the third vertical electric field in the third region III, and the fourth vertical electric field in the fourth region IV of FIG. 7.

The pixel circuit 660 may have various structures that implement the pixel circuit 200 of FIG. 2. The pixel circuit 660 may provide data signals for driving the LCD pixel 600. More specifically, the pixel circuit 660 may apply the data voltage that is provided through the data line 612 to the first thin film transistor T1 and the second thin film transistor T2. The data voltage applied to the second thin film transistor T2 may be divided by the third thin film transistor T3. The data voltage applied to the first thin film transistor T1 may be referred to as a first data voltage, and the data voltage applied to the second thin film transistor T2 and/or the third thin film transistor T3 may be referred to as a second data voltage. The first data voltage and the second data voltage that have different level of voltages may respectively charge the first capacitor C1 and the second capacitor C2. The level of the first data voltage may be higher than the level of the second data voltage because the first data voltage is the data voltage applied through the first thin film transistor T1 and the second data voltage is the data voltage divided by the second thin film transistor T2 and the third thin film transistor T3. The first data voltage stored in the first capacitor C1 may be applied to the first electrode 620, the second electrode 630, and the first slit electrode 652. The second data voltage stored in the second capacitor C2 may be applied to the second slit electrode 654. Thus, four different vertical electric fields may be generated based on potential voltage differences in the four regions (e.g., the first region I, the second region II, the third region III, and the fourth region IV) of the LCD pixel 600.

As described above, the LCD pixel 600 may be driven by dividing one pixel into the four regions (e.g., the first region I, the second region II, the third region III, and the fourth region IV). The different level of voltages may be applied to the first electrode 620, the second electrode 630, and slit electrode 650 that are included in each of the regions. Four vertical electric fields each having different potential voltage difference may be formed or generated because the level of the voltage that are applied to the first electrode 620, the second electrode 630, and the slit electrode 650 included in the four regions are different from each other. Slope angles at which the liquid crystal molecules may be tilted, arranged, or configured by or according to the vertical electric fields of the four regions may be different for each region. Thus, a side-view visibility of the LCD device may be improved.

Figure 10:
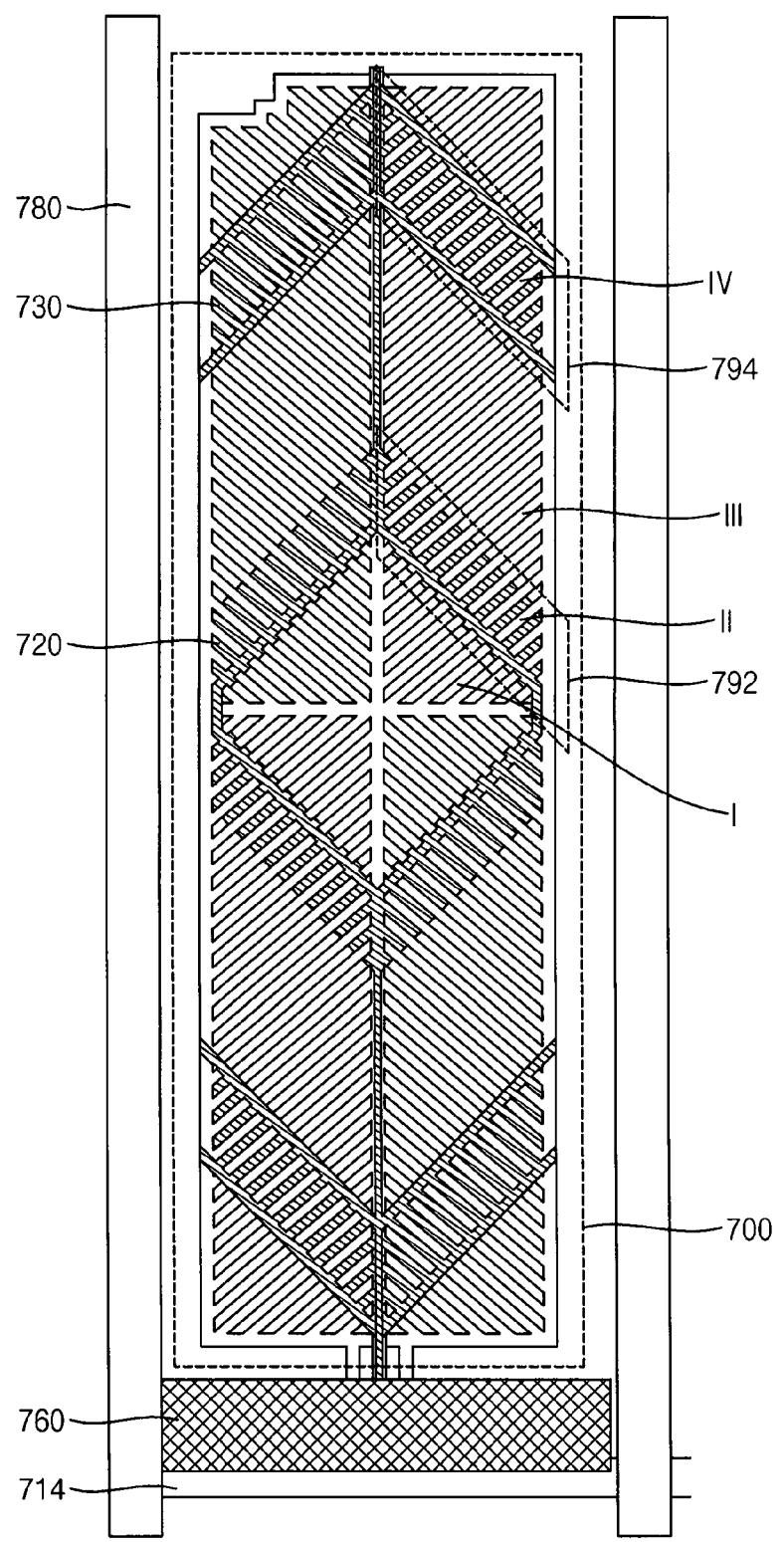
FIG. 10 is a plane view illustrating an LCD pixel according to an exemplary embodiment of the present invention.
Figure 11:
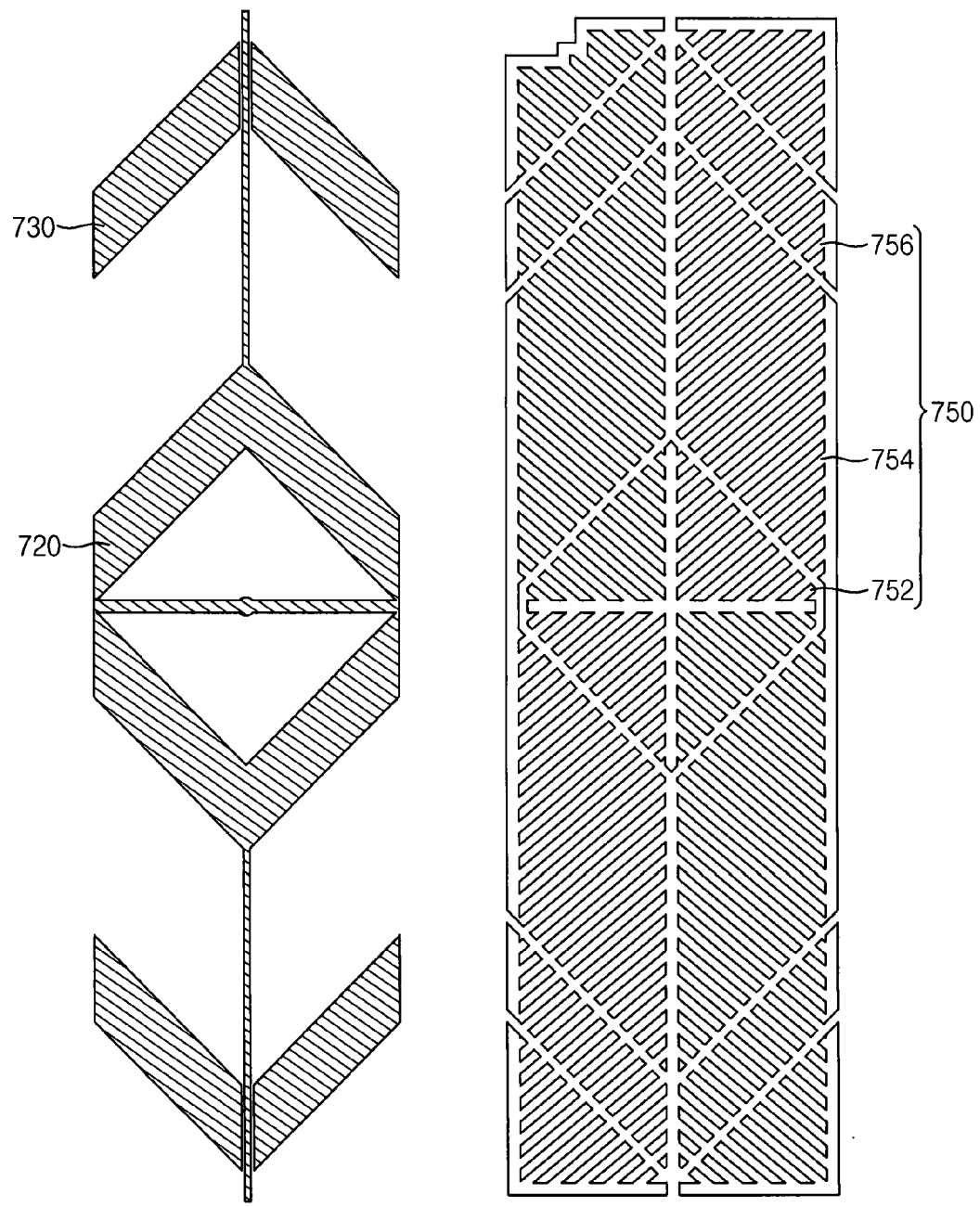
FIG. 11 is an exploded view illustrating the LCD pixel of FIG. 10.

FIG. 10 is a plane view illustrating an LCD pixel according to an exemplary embodiment of the present invention. FIG. 11 is an exploded view illustrating the LCD pixel of FIG. 10. The LCD pixel 700 of FIG. 10 and FIG. 11 may be similar to the LCD pixel 600 of FIG. 8 and FIG. 9 with an exception that a shielding electrode 780 is formed or disposed above a data line. Thus, duplicated description will not be repeated.

Referring to FIG. 10 and FIG. 11, the LCD pixel 700 may include a shielding electrode 780. The shielding electrode 780 may be formed or configured to prevent or impede a parasitic capacitance that may occur between a pixel electrode and the data line. The shielding electrode 780 may block or impede an electric field that may be generated between the pixel electrode and the data line. The shielding electrode 780 may include metal, alloy, conductive metal oxide material, transparent conductive material, etc., or a combination thereof. For example, the shielding electrode 780 may include titanium, molybdenum titanium alloy, indium tin oxide, indium zinc oxide, etc., or a combination thereof. The shielding electrode 780 may be formed, arranged, or disposed above the data line.

A second electrode 730 and a third slit electrode 754 that is disposed above the second electrode 730 may be arranged in the fourth region IV. An insulation layer may be formed or arranged between the second electrode 730 and the third slit electrode 754. According to aspects of the invention, a second double-electrode 794 may be formed by overlapping, at least in part, the second electrode 730 and the third slit electrode 756 in the fourth region IV. The second electrode 730 may be formed or configured as a plate shape having one face. The second slit electrode 753 may be formed or configured to have a fine slit pattern. According to aspects of the invention, the second electrode 730 may be coupled to the first capacitor, and the third slit electrode 756 may be coupled to the shielding electrode 780. The shielding electrode 780 may be formed or arranged above the data line. A voltage having a constant level may be applied to the shielding electrode 780. In an example, the voltage applied to the shielding electrode 780 may be lower than the second data voltage. Thus, the first data voltage may be applied to the second electrode 730, the same voltage applied to the shielding electrode 780 may be applied to the third slit electrode 756, and an upper-plate common voltage may be applied to an upper-plate common electrode. The fourth vertical electric field may be formed or generated by a potential difference between a voltage applied to the second double-electrode 794 of the first substrate and a voltage applied to the upper-plate common electrode of the second substrate in the fourth region IV. The voltage applied to the second double-electrode 794 may be lower than the voltage applied to the first double-electrode 792 of the second region II, and may be higher than the second data voltage that is applied to the second slit electrode 754 of the third region III. Thus, the fourth vertical electric field may have a higher potential difference compared to the second vertical electric field and may have a lower potential difference compared to the third vertical electric field. Liquid crystal molecules in the fourth region IV may be tilted, arranged, or configured by or according to the fourth vertical electric field.

Arrangements of the first electrode 720, the second electrode 730, and the slit electrode 750 may not be limited to exemplary embodiments of FIG. 10 and FIG. 11. The first electrode 720, the second electrode 730, and the slit electrode 750 may have various structures that may generate the first vertical electric field in the first region I, the second vertical electric field in the second region II, the third vertical electric field in the third region III, and the fourth vertical electric field in the fourth region IV of FIG. 7.

Aspects of the invention may be applied to, without limitation, an electronic device having a liquid crystal display device, such as a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) pixel, comprising:
a first substrate;
a first electrode and a second electrode disposed on the first substrate and spaced apart from each other;
an insulation layer configured to overlap at least a portion of the first electrode and the second electrode;
a first slit electrode comprising a fine slit pattern with a plurality of first branches and a second slit electrode comprising a fine slit pattern with a plurality of second branches;
a first region defined by the first slit electrode disposed on the insulation layer with corresponding first branches arranged not overlapping the first electrode and the second electrode;
a second region defined by the second slit electrode disposed on the insulation layer with a first portion of corresponding second branches arranged fully overlapping the first electrode to form a first double-electrode;
a third region defined by the second slit electrode with a second portion of corresponding second branches arranged overlapping a region between the first electrode and the second electrode;
a fourth region defined by the second slit electrode with a third portion of corresponding second branches arranged fully overlapping the second electrode to form a second double-electrode;
a second substrate disposed across from the first substrate;
an upper-plate common electrode disposed on the second substrate; and
a liquid crystal layer interposed between the slit electrodes and the upper-plate common electrode,
wherein a separate voltage is applied to each of the first electrode, the second electrode, the first slit electrode, the second slit electrode, and the upper-plate common electrode.

2. The LCD pixel of claim 1, wherein a liquid crystal molecule of the liquid crystal layer in the first region is configured according to a potential difference between a voltage applied to the first slit electrode and a voltage applied to the upper-plate common electrode.

3. The LCD pixel of claim 1, wherein a liquid crystal molecule of the liquid crystal layer in the second region is configured according to a potential difference between a voltage applied to the first double-electrode and a voltage applied to the upper-plate common electrode.

4. The LCD pixel of claim 1, wherein a liquid crystal molecule of the liquid crystal layer in the third region is configured according to a potential difference between a voltage applied to the second slit electrode and a voltage applied to the upper-plate common electrode.

5. The LCD pixel of claim 1, wherein a liquid crystal molecule of the liquid crystal layer in the fourth region is configured according to a potential difference between a voltage applied to the second double-electrode and a voltage applied to the upper-plate common electrode.

6. The LCD pixel of claim 1, wherein the LCD pixel is coupled to a pixel circuit that provides a voltage for configuring a liquid crystal molecule of the liquid crystal layer, and
wherein the pixel circuit includes:
a gate line disposed on the first substrate;
a data line disposed on the first substrate, wherein the data line is arranged to cross the gate line;
a lower-plate common electrode disposed on the first substrate;
a first thin film transistor and a second thin film transistor, both of which are coupled to the gate line and the data line;
a third thin film transistor coupled to the gate line and the second thin film transistor;
a first capacitor coupled to the first thin film transistor;
a second capacitor coupled to both the second thin film transistor and the third thin film transistor; and
a shielding electrode arranged to at least partially overlap the data line.

7. The LCD pixel of claim 6, wherein the first electrode and the first slit electrode are coupled to the first capacitor, and
wherein the second slit electrode is coupled to the second capacitor.

8. The LCD pixel of claim 6, wherein the second electrode is coupled to the lower-plate common electrode.

9. The LCD pixel of claim 6, wherein the second electrode is coupled to the shielding electrode.

10. A liquid crystal display (LCD) pixel, comprising:
a first substrate;
a first electrode and a second electrode disposed on the first substrate and spaced apart from each other;
an insulation layer configured to overlap at least a portion of the first electrode and the second electrode;
a first slit electrode comprising a fine slit pattern with a plurality of first branches, a second slit electrode comprising a fine slit pattern with a plurality of second branches, and a third slit electrode comprising a fine slit pattern with a plurality of third branches;
a first region defined by the first slit electrode disposed on the insulation layer with the corresponding first branches arranged not overlapping the first electrode and the second electrode;
a second region defined by the second slit electrode disposed on the insulation layer with a first portion of corresponding second branches arranged fully overlapping the first electrode to form a first double-electrode;
a third region defined by the second slit electrode with a second portion of corresponding second branches arranged overlapping a region between the first electrode and second electrode;
a fourth region defined by the third slit electrode disposed on the insulation layer with the corresponding third branches arranged fully overlapping the second electrode to form a second double-electrode;
a second substrate disposed across from the first substrate;
an upper-plate common electrode disposed on the second substrate; and
a liquid crystal layer interposed between the slit electrodes and the upper-plate common electrode,
wherein a separate voltage is applied to each of the first electrode, the second electrode, the first slit electrode, the second slit electrode, and the third slit electrode, and the upper-plate common electrode.

11. The LCD pixel of claim 10, wherein a liquid crystal molecule of the liquid crystal layer in the first region is configured according to a potential difference between a voltage applied to the first slit electrode and a voltage applied to the upper-plate common electrode.

12. The LCD pixel of claim 10, wherein a liquid crystal molecule of the liquid crystal layer in the second region is configured according to a potential difference between a voltage applied to the first double-electrode and a voltage applied to the upper-plate common electrode.

13. The LCD pixel of claim 10, wherein a liquid crystal molecule of the liquid crystal layer in the third region is configured according to a potential difference between a voltage applied to the second slit electrode and a voltage applied to the upper-plate common electrode.

14. The LCD pixel of claim 10, wherein a liquid crystal molecule of the liquid crystal layer in the fourth region is configured according to a potential difference between a voltage applied to the second double-electrode and a voltage applied to the upper-plate common electrode.

15. The LCD pixel of claim 10, wherein the LCD pixel is coupled to a pixel circuit that provides a voltage for configuring a liquid crystal molecule of the liquid crystal layer, and
wherein the pixel circuit includes:
a gate line disposed on the first substrate;
a data line disposed on the first substrate, wherein the data line is arranged to cross the gate line;
a lower-plate common electrode disposed on the first substrate;
a first thin film transistor and a second thin film transistor, both of which are coupled to the gate line and the data line;
a third thin film transistor coupled to the gate line and the second thin film transistor;
a first capacitor coupled to the first thin film transistor;
a second capacitor coupled to both the second thin film transistor and the third thin film transistor; and
a shielding electrode arranged to at least partially overlap the data line.

16. The LCD pixel of claim 15, wherein the first electrode, the second electrode, and the first slit electrode are coupled to the first capacitor, and
wherein the second slit electrode is coupled to the second capacitor.

17. The LCD pixel of claim 15, wherein the third slit electrode is coupled to the lower-plate common electrode.

18. The LCD pixel of claim 15, wherein the third slit electrode is coupled to the shielding electrode.

* * * * *